US009641625B2

(12) United States Patent
Santori et al.

(10) Patent No.: US 9,641,625 B2
(45) Date of Patent: May 2, 2017

(54) METHOD AND SYSTEM FOR EXECUTING AN INTERNET RADIO APPLICATION WITHIN A VEHICLE

(75) Inventors: Nello Joseph Santori, Canton, MI (US); David P. Boll, Grosse Pointe Park, MI (US); Joseph N. Ross, Ypsilanti, MI (US); Brian Woogeun Joh, Ann Arbor, MI (US); Micah J. Kaiser, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 803 days.

(21) Appl. No.: 12/480,816

(22) Filed: Jun. 9, 2009

(65) Prior Publication Data
US 2010/0311345 A1  Dec. 9, 2010

(51) Int. Cl.
| | | |
|---|---|---|
| *H05K 11/02* | (2006.01) | |
| *H04L 29/08* | (2006.01) | |
| *H04W 4/08* | (2009.01) | |
| *H04W 48/16* | (2009.01) | |
| *H04W 76/02* | (2009.01) | |

(52) U.S. Cl.
CPC ............ *H04L 67/141* (2013.01); *H04L 67/04* (2013.01); *H04L 67/14* (2013.01); *H04L 67/36* (2013.01); *H04W 4/08* (2013.01); *H04W 48/16* (2013.01); *H04W 76/02* (2013.01)

(58) Field of Classification Search
USPC ...................................................... 455/66.1
See application file for complete search history.

(56) References Cited

U.S. PATENT DOCUMENTS

| | | |
|---|---|---|
| 4,988,996 A | 1/1991 | Ito |
| 6,314,094 B1 | 11/2001 | Boys |
| 6,574,531 B2 | 6/2003 | Tan et al. |
| 6,587,127 B1 | 7/2003 | Leeke et al. |

(Continued)

FOREIGN PATENT DOCUMENTS

| | | |
|---|---|---|
| CN | 1917632 | 2/2007 |
| CN | 10139344 | 9/2007 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Hsin-Chun Liao
(74) *Attorney, Agent, or Firm* — Jennifer Stec; Brooks Kushman P.C.

(57) ABSTRACT

Various embodiments may include a computer-implemented method and system for operating a computer application stored on a nomadic wireless communication device (ND) located within the vicinity of a vehicle. An input may be received at a vehicle computer system (VCS) to pair the VCS with the ND for establishing a wireless communication link. A number of instructions may be received at the VCS from the ND over the wireless communication link. The instructions may include instructions for establishing a connection with an internet radio application and instructions for prompting a user for one or more internet radio application events. A request from the user for the one or more internet radio application events may be received at the VCS and the one or more internet radio application events may be executed.

15 Claims, 4 Drawing Sheets

(56) References Cited

U.S. PATENT DOCUMENTS

| | | |
|---|---|---|
| 6,600,975 B2 | 7/2003 | Moriguchi et al. |
| 6,788,196 B2 | 9/2004 | Ueda |
| 6,812,942 B2 | 11/2004 | Ribak |
| 6,842,677 B2 | 1/2005 | Pathare |
| 7,159,000 B2 | 1/2007 | Plastina et al. |
| 7,362,999 B2 | 4/2008 | Petschke |
| 7,552,009 B2 | 6/2009 | Nelson |
| 7,567,861 B2 | 7/2009 | Inagaki |
| 7,752,567 B2 | 7/2010 | Hedrick |
| 7,764,247 B2 | 7/2010 | Blanco et al. |
| 7,796,019 B2 | 9/2010 | Yamada |
| 8,042,140 B2 | 10/2011 | Thomas et al. |
| 8,055,540 B2 | 11/2011 | Pudar |
| 8,120,478 B2 | 2/2012 | Skaff et al. |
| 8,335,494 B2 | 12/2012 | Wilkerson |
| 2002/0072326 A1 | 6/2002 | Qureshey et al. |
| 2002/0085043 A1 | 7/2002 | Ribak |
| 2002/0188392 A1 | 12/2002 | Breed et al. |
| 2004/0093155 A1 | 5/2004 | Simonds et al. |
| 2004/0093299 A1 | 5/2004 | Bodin et al. |
| 2004/0246940 A1 | 12/2004 | Kubler et al. |
| 2004/0249663 A1 | 12/2004 | Shishido |
| 2005/0024189 A1 | 2/2005 | Weber |
| 2005/0055372 A1 | 3/2005 | Springer, Jr. et al. |
| 2006/0293813 A1 | 12/2006 | Nou |
| 2007/0061057 A1 | 3/2007 | Huang et al. |
| 2007/0233725 A1 | 10/2007 | Michmerhuizen et al. |
| 2007/0299978 A1 | 12/2007 | Neumann et al. |
| 2008/0114664 A1 | 5/2008 | Harb |
| 2008/0218409 A1 | 9/2008 | Moinzadeh et al. |
| 2008/0319665 A1 | 12/2008 | Berkobin et al. |
| 2009/0075624 A1 | 3/2009 | Cox et al. |
| 2009/0117890 A1 | 5/2009 | Jacobsen et al. |
| 2009/0144622 A1 | 6/2009 | Evans et al. |
| 2009/0222341 A1 | 9/2009 | Belwadi et al. |
| 2009/0228158 A1 | 9/2009 | Medler et al. |
| 2009/0319341 A1 | 12/2009 | Berkobin et al. |
| 2009/0326949 A1 | 12/2009 | Douthitt et al. |
| 2010/0241507 A1 | 9/2010 | Quinn et al. |
| 2010/0280956 A1 | 11/2010 | Chutorash et al. |
| 2010/0283626 A1 | 11/2010 | Breed |
| 2010/0305951 A1 | 12/2010 | Ostrowski et al. |
| 2010/0311345 A1 | 12/2010 | Santori et al. |
| 2010/0312369 A1 | 12/2010 | Dollar, Jr. |
| 2010/0330975 A1 | 12/2010 | Basir |
| 2011/0296037 A1 | 12/2011 | Westra et al. |
| 2012/0030470 A1 | 2/2012 | Jdanov et al. |
| 2012/0095643 A1 | 4/2012 | Bose et al. |
| 2013/0038635 A1 | 2/2013 | Bales et al. |

FOREIGN PATENT DOCUMENTS

| | | |
|---|---|---|
| EP | 1137210 A2 | 9/2001 |
| GB | 2366055 A | 2/2002 |
| WO | WO2007123797 A1 | 11/2007 |

OTHER PUBLICATIONS

Ford Motor Company, "SYNC," Owner's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Kermit Whitfield, "A hitchhiker's guide to the telematics ecosystem", Automotive Design & Production, Oct. 2003, http://findarticles.com, pp. 1-3.

International Searching Authority, International Search Report for the corresponding PCT Application No. PCT/US2010/37057 mailed Sep. 8, 2010.

www.wired.com/entertainment/music/commentary/listeningpost/2005/11/69653, printed Sep. 4, 2008.

www.magic-tagger.com/eng/home.php, printed Oct. 31, 2008.

www.magnusbrading.com/mp3ts/main.html, printed Sep. 4, 2008.

www.softpointer.com/index.htm, printed Sep. 4, 2008.

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

METHOD AND SYSTEM FOR EXECUTING AN INTERNET RADIO APPLICATION WITHIN A VEHICLE

BACKGROUND

1. Technical Field

Various embodiments include a method and system for executing an internet radio application. More particularly, the various embodiments include executing an internet radio application from a vehicle.

2. Background

Typically, applications stored on a portable device (such as a mobile phone) require tactile commands to accomplish one or more operations of the application. For example, if a user desires to operate an internet radio application on his or her portable device, he or she may be required to physically input which stations and/or genres of music they want to listen to from his or her portable device keypad. An exemplary internet radio application known in the art is the Pandora application distributed by Pandora Media, Inc. Furthermore, applications on a portable device may require the user to visually receive outputs from the application in order to operate the application. What is desired is a way for a user to operate one or more applications from a portable device using hands-free access in order to enable safe driving for the user.

An internet radio application is an exemplary application which a user may desire to operate using hands-free accessibility from his or her portable device. Various embodiments of an internet radio are present in the art. One exemplary environment in which a user may want to operate the internet radio application is in his or her vehicle equipped with the SYNC communications system manufactured and distributed by the Ford Motor Company.

U.S. Pat. No. 6,314,094 issued to Boys discloses a mobile wireless internet portable radio. The Internet-capable radio has a communication port for connection to a modem and a connection function for connecting to the Internet upon user initiation while connected to the modem. The radio also had sound circuitry for rendering audio data packets received over the Internet as analog audio output and for delivering the audio output to one or more speaker ports. Two or more stored hyperlinks addressing Internet broadcast servers are also present and a user input adapted to enable a user to select among the stored hyperlinks. Selection of one of the stored hyperlinks by the user input invokes the hyperlink and connects the radio to the server addressed by the hyperlink, initiating an audio data stream as data packets from the broadcast server to the radio. The radio renders the data stream as analog audio data delivered to the one or more speaker ports. The user input has a plurality of pushbuttons associated with hyperlinks, which can be asserted by activating a pushbutton. A directory server is used for editing user profiles and programming connected Internet-capable radios.

US Publication Number 2002/0072326 to Qureshy et al discloses an intelligent radio. The intelligent radio apparatus is adapted to receive Web radio broadcasts. The Web Radio provides a user interface that is less like a computer program and more like a conventional radio. The intelligent radio provides familiar radio-type user controls such as switches, a tuning knob, joysticks, cursor controls, and voice activated controls. The radio-type user controls allow the user to select a Web radio station and control other aspects of the operation of the intelligent radio in a manner that is more like a conventional radio and less like a computer program. The intelligent radio is configured to run software needed to access the Internet. The intelligent radio also provides Internet telephony, voicemail, and voice-email capabilities.

SUMMARY

One aspect of the various embodiments includes a computer-implemented method for operating a computer application stored on a nomadic wireless communication device (ND) located within the vicinity of a vehicle. The method may include receiving input at a vehicle computer system (VCS) to pair the VCS with the ND to establish a wireless communication link between the VCS and the ND. The method may further include receiving at the VCS one or more first instructions from the ND over the wireless communication link.

The one or more first instructions may include instructions for establishing a connection with an internet radio application and instructions for prompting a user for one or more internet radio application events. The instructions for establishing a connection with the internet radio application may further include instructions for establishing an Internet connection using the ND. In one embodiment, the one or more first instructions may further include instructions for disconnecting the connection between the internet radio application and the VCS.

The method may further include receiving at the VCS a request from the user for the one or more internet radio application events. The method may further include executing the one or more internet radio application events.

In some embodiments, executing the one or more internet radio application events may include transmitting one or more messages to the ND to execute the one or more internet radio application events according to the request. The one or more internet radio application events may include, but are not limited to, playing a plurality of songs, storing one or more songs, changing a station played from the internet radio application, changing a track played from the internet radio application, receiving and storing feedback associated with one or more songs, and terminating the internet radio application.

In some embodiments, the executing step of the method may include receiving one or more second instructions from the internet radio application executing on the ND. The one or more second instructions may include instructions for speaking textual information issued from the internet radio application. The textual information may include, but is not limited to, a connection confirmation, at least one radio station name, an artist name, and a song name.

In some embodiments, the first instructions or second instructions may further include at least one additional instruction associated with a completion of an operation performed by the one or more first instructions or the one or more second instructions. The method may further include transmitting an identifier and the at least one additional instruction to the internet radio application executing on the ND. The identifier may identify the completion of the operation performed by the one or more first instructions or the one or more second instructions.

In some embodiments, the method may further include utilizing an application programming interface (API) to establish a connection between the VCS and the internet radio application executing on the ND to transmit data between the VCS and the internet radio application.

In some embodiments, the method may further include receiving at the VCS a request from the user for operating the internet radio application executing on the ND. The request may be received from the user in response to a trigger in the vehicle such as a button press, a voice-activated trigger, or both.

Another aspect of the various embodiments includes a computer-implemented system for operating a computer application stored on a nomadic wireless communication device (ND) located within the vicinity of a vehicle. The system may include a vehicle computer system (VCS). The VCS may be configured to pair with the ND to establish a wireless communication link between the VCS and the ND. The VCS may be further configured to receive one or more first instructions from the ND over the wireless communication link.

The one or more first instructions may include instructions for establishing a wireless connection with an internet radio application and instructions for prompting a user for one or more internet radio application events. The instructions for establishing a connection with the internet radio application may further include instructions for establishing an Internet connection using the ND.

The VCS may be further configured to receive a request from the user for the one or more internet radio application events and execute the one or more internet radio application events.

In some embodiments, the VCS may execute the one or more internet radio application events by transmitting one or more messages to the ND for execution of the one or more internet radio application events according to the request.

The VCS maybe further configured to receive one or more second instructions from the ND. The one or more second instructions may include instructions for speaking textual information issued from the internet radio application.

The first instructions or second instructions may further include at least one additional instruction associated with a completion of an operation performed by the one or more first instructions or the one or more second instructions. The VCS maybe further configured to transmit an identifier and the at least one additional instruction to the internet radio application. The identifier may identify the completion of the operation performed by the one or more first instructions or the one or more second instructions.

Another aspect of the various embodiments includes a computer-implemented system for operating a computer application stored on a nomadic wireless communication device (ND) located within the vicinity of a vehicle. The system may include a means for receiving input at a vehicle computer system (VCS) to pair the VCS with the ND to establish a wireless communication link between the VCS and the ND. The system may further include a means for receiving a request from a user for operating an internet radio application executing on the ND. The system may further include a means for receiving at the VCS one or more first instructions from the ND over the wireless communication link.

The one or more first instructions may include instructions for establishing a connection with an internet radio application and instructions for prompting the user for one or more internet radio application events.

The system may further include a means for receiving at the VCS a request from the user for the one or more internet radio application events. The system may further include a means for executing the one or more internet radio application events. The system may execute the one or more internet radio application events by transmitting one or more messages to the ND to execute the one or more internet radio application events according to the request.

These and other aspects of the present invention will be better understood in view of the attached drawings and following detailed description of the invention.

BRIEF DESCRIPTION OF THE DRAWINGS

Features of the present invention which are believed to be novel are set forth with particularity in the appended claims. The present invention, both as to its organization and manner of operation, together with further object and advantages thereof, may best be understood with reference to the following description, taken in connection with the accompanying drawings, which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Mobile devices today are more than just a communication vehicle for users. Mobile devices may be equipped with features that provide the user the benefit of engaging in activities that may traditionally have been performed through another means. With mobile devices becoming an integral part of society, users want uninterrupted access to their device's services and features. The difficulty and concern with such access occurs when the user is driving a vehicle. Drivers, in particular, cannot be distracted from focusing on their driving.

For example, drivers may want to access certain application on their phone such as audio files, text messages, and their calendar to name a few. Typically, a user may be required to physically operate his or her mobile device in order to retrieve these applications. This may not only create a hazard for the driver and/or passenger, but may create a hazard for others on the road as well.

Some mobile devices provide applications for an internet radio (e.g., the Pandora Application). Internet radio allows a user to listen to a number of radio stations, as in conventional radios, but the music is streamed over an internet connection to the mobile device. Like conventional radios, internet radios, even on mobile devices, may require a user to physically operate the application through, for example, button presses. Furthermore, the internet radio may only have a visual interface, thus requiring the user to receive all outputs from the internet radio and submit all inputs through visual interaction with the application.

Accordingly, a method and system for managing an internet radio application from a vehicle is presented in one or more embodiments. While various embodiment disclosed are presented in the context of operating an internet radio application from a vehicle, this is provided by way of example only. The present invention may be used within other types of environments in which hands-free accessibility of mobile device applications is desired.

Figure 1:
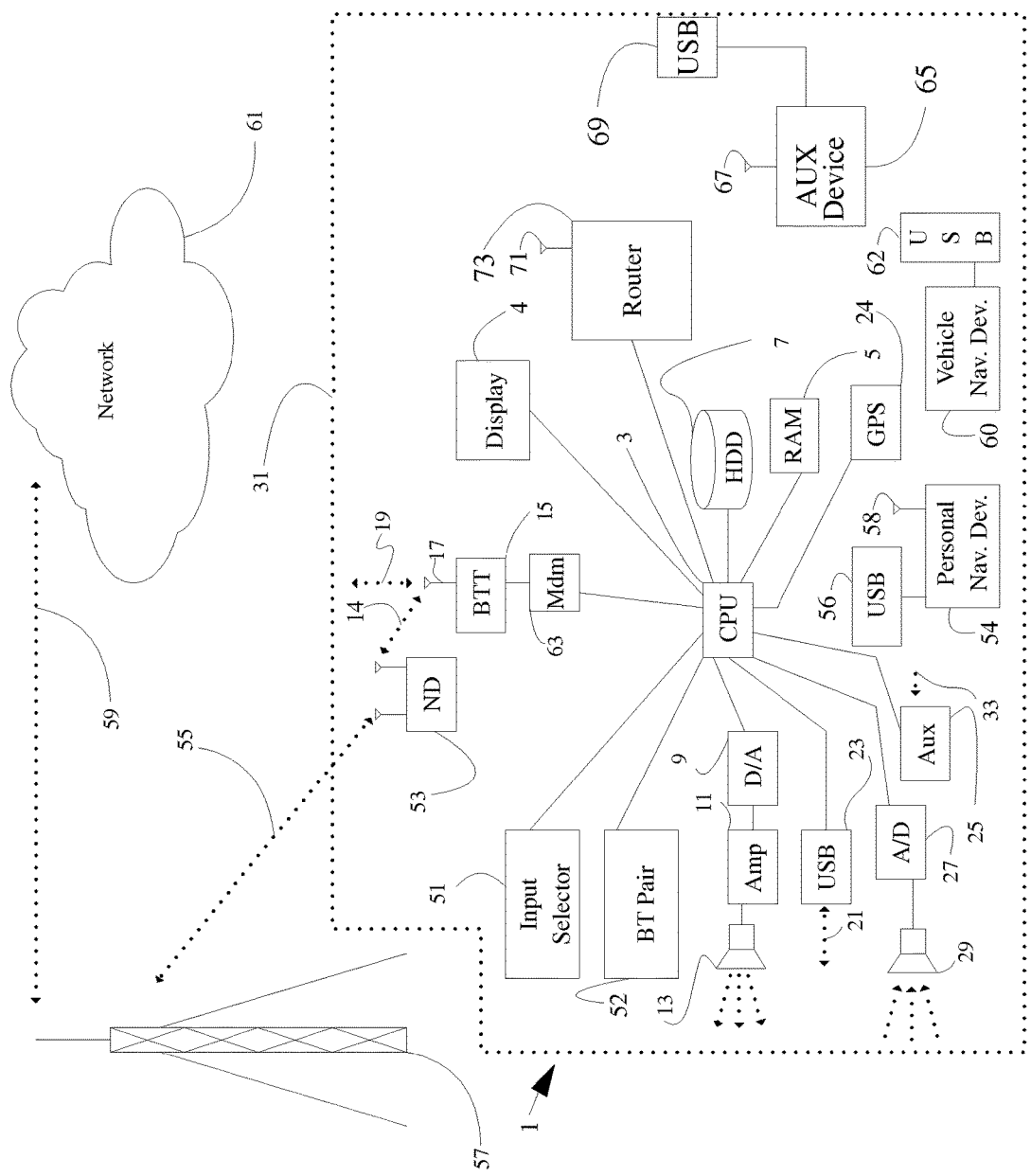
FIG. 1 illustrates an example block topology for a vehicle computer system for enabling the execution of an internet radio application within the vehicle.

FIG. 1 illustrates an example block topology for a vehicle computer system 1 (hereinafter referred to as VCS 1) for enabling, for example, the management and execution of an internet radio application from the vehicle. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment shown in FIG. 1, a processor 3 controls at least some portion of the operation of the vehicle-based computing system 1. Provided within the vehicle, the processor 3 allows onboard processing of commands and routines. Further, the processor 3 maybe connected to both non-persistent 5 and persistent storage 7. In this illustrative embodiment, the non-persistent storage is random access memory (RAM) and the persistent storage is a hard disk drive (HDD) or flash memory.

The processor 3 is also provided with a number of different inputs allowing the user to interface with the processor 3. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor 3.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 14 with a user's nomadic device 53 (e.g., cell phone, smart phone, PDA, etc.) (hereinafter referred to ND 53) using BLUETOOTH antenna 17. The ND 53 can then be used to communicate 59 with a network 61 outside the vehicle 31 through, for example, communication 55 with a cellular tower 57.

Pairing a ND 53 and the BLUETOOTH transceiver 15 can be instructed through a button 52 or similar input, telling the CPU 3 that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU 3 could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Operation of one or more embodiments of the present invention will be described with respect to FIGS. 2 and 3. Upon pairing the ND 53 to the CPU 3 as in block 80, a user may request operation of the internet radio computer application (hereinafter referred to as the "Application") by triggering activation of the Application from the vehicle as in block 92. For example, a user may press a button on the vehicle steering wheel (e.g., a push-to-talk button) or speak a command to activate. In one embodiment, prior to receiving a request for the Application, the CPU 3 may establish a connection to one or more client-side APIs or applets executing on ND 53 using an application programming interface (API) as illustrated in block 82. The API is described below in greater detail with respect to FIG. 4.

The CPU 3 may establish a connection based on a trigger from the user (e.g., a button press, a voice command or both). For example, a user may press a push-to-talk button disposed on a steering wheel of the vehicle and then say "applications." The CPU 3 may include speech recognition software so that the CPU 3 may interpret and process instructions issued from a user. For example, the CPU 3 may receive instruction for establishing a connection with the ND 53 using the API. It should be understood that the speech recognition software may recognize other commands as described throughout this application and that the example provided is illustrative.

Using the API, the CPU 3 may then query the ND 53 to determine the applications present on the device for operation via CPU 3. The user may or may not then receive a prompt for another request. In either case, the user may then issue another request (e.g., through a button press and/or voice instruction) for one or more applications available on the ND 53. The CPU 3 may provide to the user (e.g., via a display 4 or in a spoken language outputted from speaker 13) the one or more applications available on the ND 53 as in block 84.

The requested Application may or may not be available on the ND 53 as in block 86. If the Application is not available, the user may be prompted that the Application is unavailable as illustrated in block 88. The user may be required to first download the Application from an external website or from the VCS 1 memory (e.g., HDD 7) prior to operating the Application. If the Application is available on the ND 53, the user may then operate the Application as described below.

In one embodiment, the user may "wake-up" the CPU 3 (e.g., through a button press or a voice command) prior to making a request for any application so that the user may operate applications via CPU 3.

If the Application is available on the ND 53 and when a request for activation of the Application is received by the CPU 3, the CPU 3 may then communicate a message to the ND 53 to activate or launch the requested Application on ND 53 as in block 90. The message may be translated into Unicode (e.g., UTF-8 or UTF-16) and transmitted to the ND 53. In one illustrative embodiment, the message may be translated into ASCII code.

Upon receiving the message from the CPU 3, the ND 53 may launch the Application as in block 90. Using the client-side API or applet, the Application may output a number of instructions to the CPU 3 for operating the Application as will be described in further detail below with respect to FIGS. 2 and 3. In one embodiment, the instructions may be in the extensible markup language (XML) format. Alternatively or additionally, the Application may directly output instructions from the ND 53 to the CPU 3 for accomplishing one or more operations of the various embodiments of the present invention.

In one embodiment, one or more of the operations/instructions may be synchronous or asynchronous. As used herein, an asynchronous operation may be one that runs until a return message is sent back to the Application indicating that the instruction is completed. In one embodiment, instructions relating to the operation and management of the Application may be transmitted and executed before the Application receives the completion instruction.

The instructions to perform the operation may be in the form of "procedure (parameter)" wherein "procedure" may define the task or event to be performed and "parameter" may define the one or more arguments that the procedure may accept to perform the task or event. It should be understood that this format is exemplary and, therefore, non-limiting, such that other formats may be used for achieving one or more operations described below.

Figure 2:
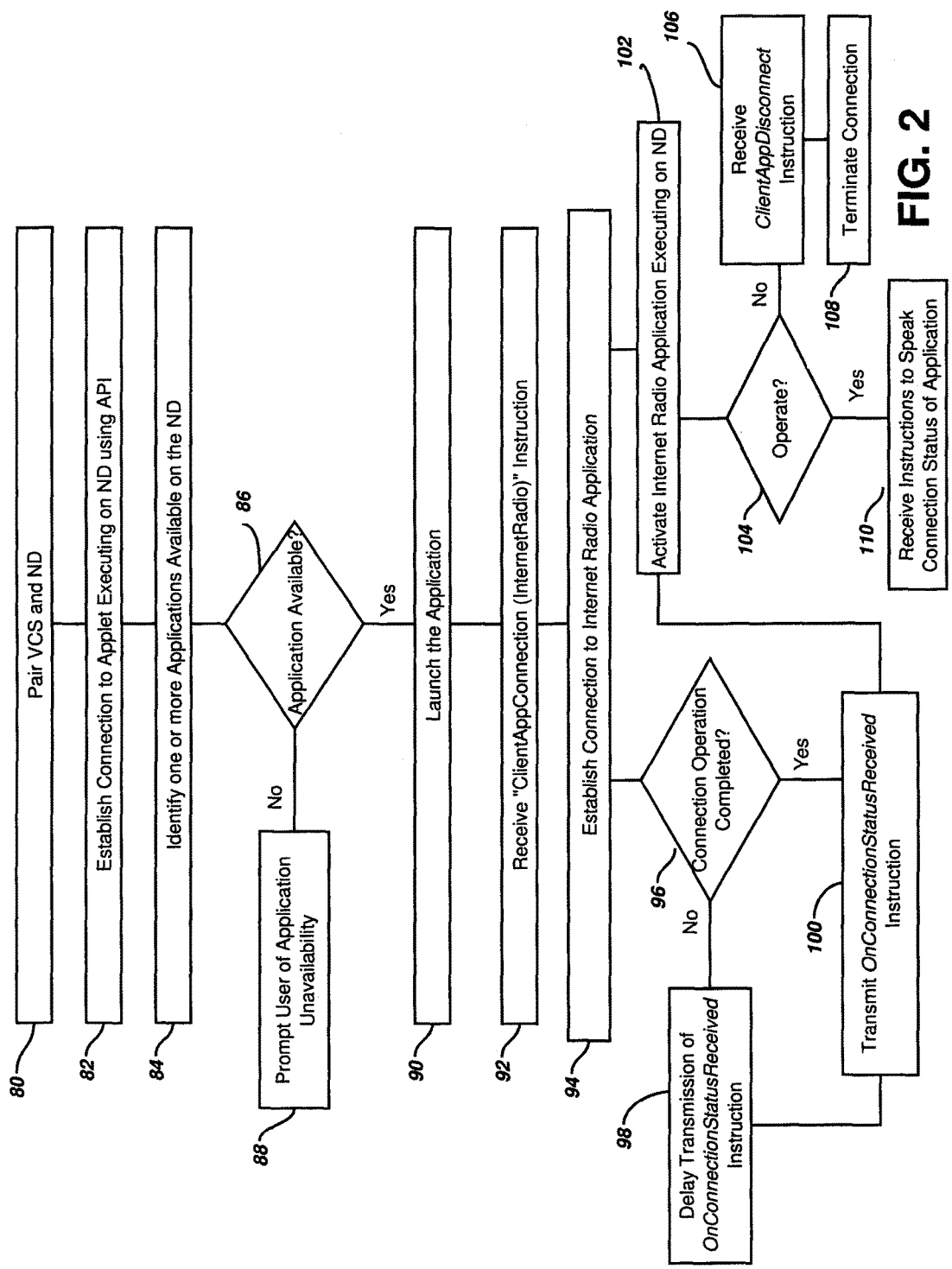
FIG. 2 illustrates the operation of executing an internet radio application within a vehicle according to one of the various embodiments of the present invention.
Figure 3:
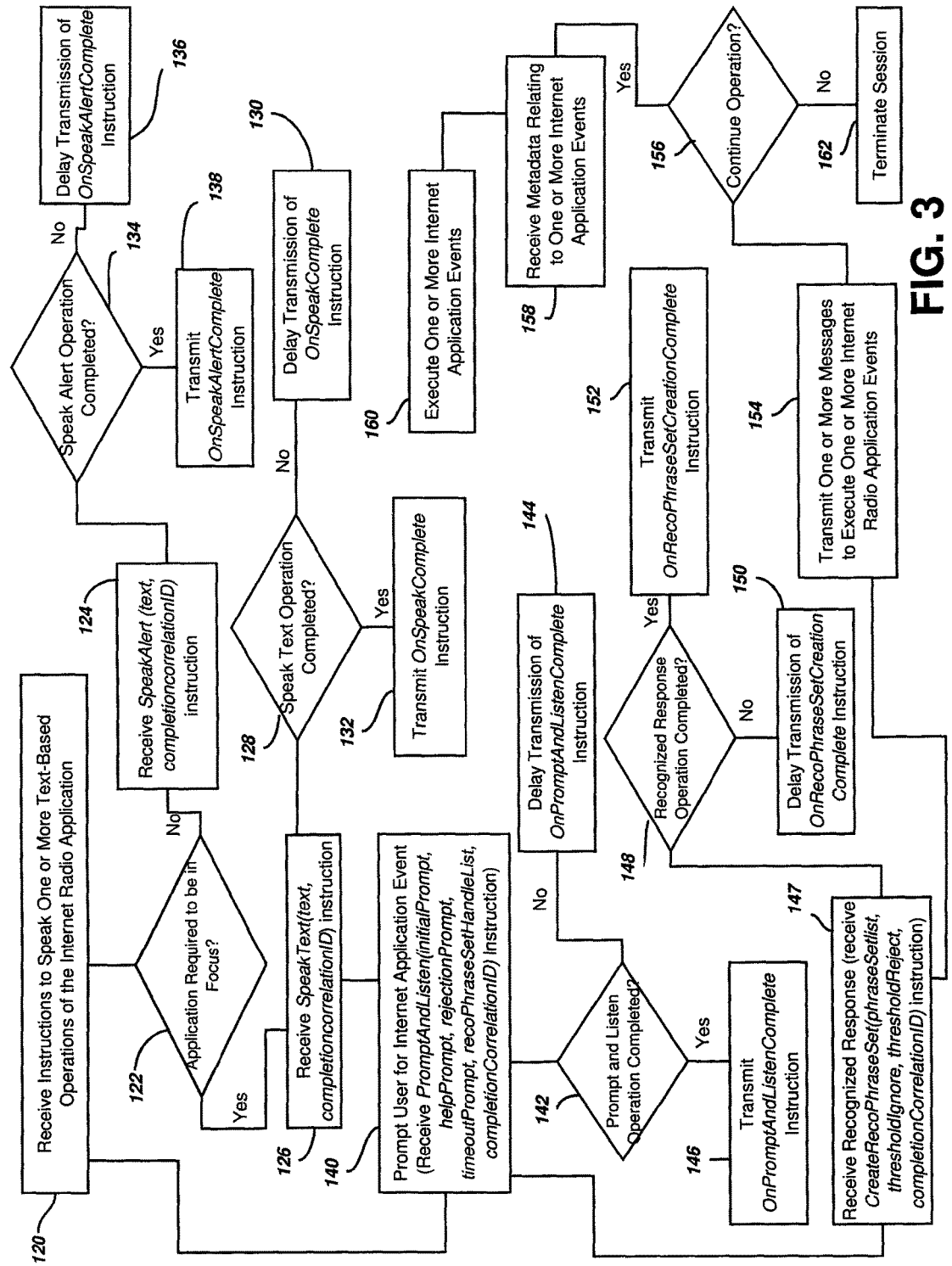
FIG. 3 illustrates the operation of executing an internet radio application within a vehicle according to another one of the various embodiments of the present invention.

With additional reference to FIG. 3, upon receiving one or more messages from the CPU 3, the Application may transmit an instruction to connect with the CPU 3 as in block 92 (FIG. 2). One exemplary instruction may be "ClientAppConnect (appName)." A connection may be established as illustrated in block 94.

"AppName" may identify the application to be operated. Thus, for example, if the application is the internet radio application (e.g., such as "Pandora" manufactured and distributed by Pandora Media, Inc.), the instruction may be written as "ClientAppConnect (Pandora)." If the application is an appointment reader, the syntax may be "ClientAppConnect (CalendarReader)." In one embodiment, the Application may receive a return instruction identifying a connection status (e.g., a completed connection) with the CPU 3. An exemplary return instruction may be "OnConnectionStatusReceived." CPU 3 may determine whether the connection operation is complete as in block 96. If the connection operation is not complete, then CPU 3 may delay transmission of the OnConnectionStatusReceived instruction as illustrated in block 98. If the connection operation is complete, then CPU 3 may transmit the instruction to the Application as in block 100.

The Application may also receive a unique identification (ID) number representing the connection status with the CPU 3. The ID may only be valid for the duration of the connection (i.e., until the connection is disconnected).

After a connection has been made with the CPU 3, the Application may be activated and operated through the CPU 3 after launching the internet radio application as in block 102. Establishing a connection may include establishing a connection to the Application over a communication network (e.g., the Internet).

A user may have the option to disconnect operation of the Application at any time as illustrated in block 104. If the user chooses to disconnect use of the Application, he or she may speak a command to exit the Application. One or more messages may be transmitted from the CPU 3 to the ND 53 for disconnecting the internet radio session. In response, a disconnect instruction may be received by CPU 3 as in block 106. An instruction to disconnect with the CPU 3 may be represented by "ClientAppDisconnect." Accordingly, once the connection to the CPU 3 is terminated, any further communication by the Application to the CPU 3 using the same connection may be ignored as in block 108.

If the user chooses not to disconnect, CPU 3 may receive instructions from ND 53 to speak the connection status to operate the Application as in block 110. Operation of the Application may be accomplished through a text-to-speech (TTS) and/or a speech-to-text (STT) conversion. For example, when a user desires to use the Application (and other applications that may be on his or her ND 53), he or she may issue a voice-activated command to activate the Application which may be received by microphone 29. A module in the CPU 3 may include computer-executable instructions for converting the speech into text. The text may then be communicated (e.g., in ASCII code) to the client-side API or applet in the ND 53 for activating the requested Application. The Application may then be activated upon receiving the instructions from the client-side API.

The ND 53 may then issue a return command to the CPU 3 to speak the requested application signaling to the user that the requested application has been identified as in block 120. The return command may be generated from the Application as text. Accordingly, an instruction may be issued by the Application to speak the specified text to the user as in block 120. For example, if the user requests the application "Pandora," the Pandora application (through the ND 53) may then transmit an instruction to the CPU 3 to say, for example, "Welcome to Pandora. Connecting . . . " Such a message may be displayed on the visual interface of the ND 53 (if operating the Application through the ND 53). Using one or more embodiments of the present invention, however, the text maybe converted to speech.

One syntax example of a return instruction may be "SpeakText (text,completionCorrelationID)" (hereinafter referred to as "the speak text instruction"). The instruction may include an additional instruction to identify the completion of the event (i.e., speaking the text) as in block 128. One syntax example of such an instruction may be "OnSpeakComplete." CPU 3 may determine whether the speak text operation is complete. If CPU 3 determines that the operation is not complete, CPU 3 may delay transmission of the OnSpeakComplete instruction as illustrated in block 130. If the connection operation is complete, then CPU 3 may transmit the instruction to the Application as in block 132. The speak text instruction may be used to speak the specified text through the VCS 1 speakers 13. SpeakText may represent the event that is to occur, "text" may represent the text to be spoken by the CPU 3 through VCS 1, and "completionCorrelationID" may represent an identifier to be returned upon completion of the event. The identifier may be sent with the "OnSpeakComplete" event.

In one embodiment, in order for the speak text instruction to be completed, the Application may or may not be required to be "in focus" as in block 122. Thus, for example, for the user to receive the message, "Welcome to Pandora," from the VCS 1, the system may be programmed to ensure that the Application is the one with which the user is interacting at that time. In instances where the system may be programmed so that Application does not need to be "in focus," the Application may issue the same or a separate instruction. One example of a separate instruction may be "speakAlert (text,completionCorrelationID)" (hereinafter referred to as the "speak alert instruction") which may be received by CPU 3 if the Application is not required to be in focus as in block 124. If the Application is required to be in focus, then the speak text instruction may be received as in block 126. The speak alert instruction may be asynchronous and include the instruction "OnSpeakAlertComplete" to signify the completion of the speak text instruction event to the Application. CPU 3 may determine whether the speak alert operation is complete as in block 134. If the operation is not complete, then CPU 3 may delay transmission of the OnSpeakAlertComplete instruction as illustrated in block 136. If the connection operation is complete, then CPU 3 may transmit the instruction to the Application as in block 138.

It should be understood that the speak text instruction may be issued when connecting to the Application and during operation of the Application. Thus, it is not only limited to launching the Application. It may be used for commanding operation of the Application.

For example, the CPU 3 may receive from the Application instructions to provide one or more radio channels that can be played to the user from the CPU 3 through VCS 1. These channels may then be presented to the user using the speak text instructions. For example, an instruction issued from the Application may cause the CPU 3 to say, "Please say a station: '90's rock', '70's classics,' 'top 40.'" If a user desires to listen to a particular genre of music or channel from his or her Application, he or she may say "Top 40" which may be received by microphone 29 and transmitted to the CPU 3. The CPU 3 may then transmit one or more messages (e.g., in ASCII code) to the client-side API or applet on ND 53 to cause the Application to launch a Top 40 station. The audio from that channel may then be streamed to the CPU 3 for playback through speakers 13.

Other non-limiting voice commands for operating the Application may include commands for moving between tracks (e.g., "next track"), rating songs (e.g., "vote down" and "vote up"), saving songs (e.g., "bookmark song"), moving between stations (e.g., "change stations"), listing stations (e.g., "list stations"), and exiting the Application (e.g., "exit").

The CPU 3 may prompt the user for commands to operate the Application as in block 140. For example, a user may hear "Please say a station: '90's rock', '70's classics,' 'top 40.'" One or more of these prompts may include a plurality of parameters. One exemplary instruction may be for prompting the user and listening for a recognized response. As will be described below, the recognized responses may be based on additional instructions programmed to the module. The prompting instructions and the recognizing response instructions may have a particular syntax. For example, one exemplary syntax may be "PromptAndListen (initialPrompt, helpPrompt, rejectionPrompt, timeoutPrompt, recoPhraseSetHandleList, completionCorrelationID) (hereinafter referred to as the "prompt instruction"). This instruction may be associated with an additional instruction signifying the completion of this event. An exemplary syntax of such an instruction may be "OnPromptAndListenComplete." CPU 3 may determine whether the prompt and listen operation is complete as in block 142. If the operation is not complete, then CPU 3 may delay transmission of the OnPromptAndListenComplete instruction as illustrated in block 144. If the prompt and listen operation is complete, then CPU 3 may transmit the instruction to the Application as in block 146.

"PromptAndListen" of the prompt instruction may represent the occurring event (i.e., prompt and listen). "initialPrompt" may include the text to be spoken to the user before listening starts. "helpPrompt" may include the text to be spoken to the user if he or she asks for help during a listening event. "rejectionPrompt" may include text to be spoken to a user if he or she fails to speak a recognizable phrase. "timeoutPrompt" may include the text to be spoken to the user if he or she fails to speak a recognizable phrase. "recoPhraseSetHandleList" may include a number of phrase set handles (or phrase set identifiers) created during the event session for recognizing one or more pre-programmed phrases. In one embodiment, any recognized phrases may be returned to the application using the "OnPromptAndListenComplete" instruction. The return instruction may also include an identifier included in the "completionCorrelationID" instruction event.

Recognizing the responses listened for by the CPU 3 upon outputting a prompt may be accomplished through a number of further instructions as in block 147. These instructions may create a set of phrases that can be listened for during a "PromptAndListen" operation. An exemplary syntax of such an instruction may be "CreateRecoPhraseSet (phraseSetList, thresholdIgnore, thresholdReject, completionCorrelationID)" (hereinafter referred to as the "recognized response instruction"). The recognized response instruction may be associated with an additional instruction to signify the completion of the recognized response event. An exemplary return instruction may be "OnRecoPhraseSetCreationComplete." The return instruction may include a phrase set identifier (i.e., handle) for use with subsequent prompt instructions. CPU 3 may determine whether the recognized response operation is complete as in block 148. If the operation is not complete, then CPU 3 may delay transmission of the OnRecoPhraseSetCreationComplete instruction as illustrated in block 150. If the recognized response operation is complete, then CPU 3 may transmit the instruction to the Application as in block 152.

"CreatRecoPhraseSet" of the recognized response instruction may represent the phrase set creation event used for recognition. "phraseSetList may include a number of phrase strings to be recognized by the CPU 3. "thresholdIgnore" may include a numeric value between a predetermined range (e.g., between 0 and 100) indicating the recognition confidence level to be attained for a response (i.e., phrase) from the user to not be ignored. "thresholdReject" may include a numeric value between a predetermined range (e.g., between 0 and 100) indicating the recognition confidence level to be attained for a response (i.e., phrase) from the user to not be rejected. "completionCorrelationID" may be an identifier included in the "OnRecoPhraseSetCreation-Complete" instruction which may signify completion of a phrase-set creation operation.

Upon receiving a request for the internet radio application event (e.g., play "Top 40"), the CPU 3 may then transmit one or more messages (e.g., in ASCII code) to the client-side API or applet causing the Application to execute the internet radio application event as in block 154. For example, if the user requests "Top 40," the Application may launch media items (e.g., songs) from the "Top 40" staton. The CPU 3 may then receive over communication network 61 (e.g., the Internet) media items (e.g., songs) from the requested station as in block 158. The songs may be received as metadata from the Application. In one embodiment, the CPU 3 may receive a playlist of songs. The internet application event may be executed at the VCS 1 such that, for example, the audio from that channel may then be streamed to the user as in block 160. The one or more internet radio application events may be to terminate operation of the Application. If the CPU 3 receives instructions to exit the Application as in block 156, then CPU 3 may terminate the session as in block 162.

Other non-limiting internet radio application events may include moving between tracks, rating songs, saving songs, moving between stations, and listing stations.

In one embodiment, text may be displayed on display 4. The text that is displayed to be limited to a predetermined amount (e.g., 12 characters). In one embodiment, the text may be displayed to the user in a "marquee-style." The Application may issue a further instruction in order to accomplish this operation. One example instruction may be "DisplayText (text)" where "text" may represent the text to be displayed on the radio head (not shown) of the CPU 3. When a station is selected by a user (e.g., "top 40"), the Application may transmit metadata representing information about the media item. This may accomplish, in some embodiments, a "play list" to be generated and displayed to the user. In one embodiment, the system may be programmed so that the Application is in focus in order for this instruction to be performed.

In some embodiments, the Application may communicate with a number of executable programs (i.e., dynamic link libraries or DLLs) stored in a module in the ND 53. The DLLs may be used to interface with an Application programming interface (API) in order to communicate with the CPU 3. Additionally, the Application may communicate with one or more DLLs for performing World Wide Web (WWW) operations (e.g., based on the .Net architecture developed and distributed by the Microsoft Corporation).

Figure 4:
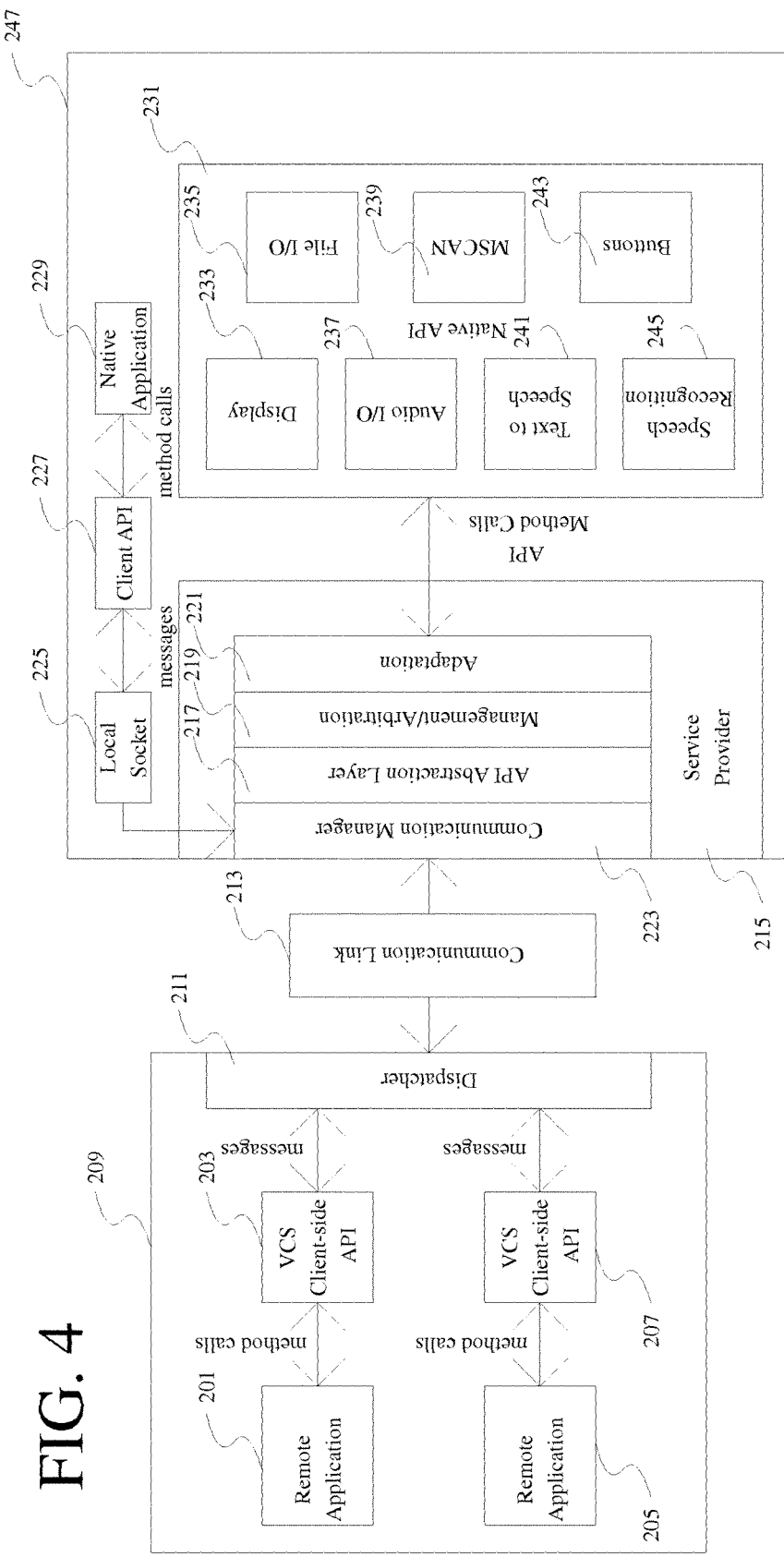
FIG. 4 shows an illustrative exemplary remote device running one or more applications in communication with a vehicle based computing system.

FIG. 4 shows an illustrative exemplary remote device 209 running one or more applications in communication with a vehicle based computing system 247. In this illustrative embodiment, a remote device 209 (e.g., without limitation, a cell phone, PDA, GPS device, etc.) has one or more remote applications 201, 205 stored thereon. The remote applications communicate with the vehicle based computing system 247, using a vehicle computing system (VCS) client side API 203, 207. This API could, for example, be provided to developers in advance, and define the format of outgoing and incoming packets so that communication between the remote device 209 and the vehicle based computing system 247 is possible. A dispatcher 211 can be provided to the remote device 209 if more than one application is communicating at the same time.

Data is passed from the remote device to the vehicle communication system through a communication link 213. This can be a wired or wireless link, and can be half or full duplex. In one illustrative embodiment, the communication is a full duplex communication. In one non-limiting example, the link is a BLUETOOTH link.

The vehicle system 247 has various applications stored thereon, including, but not limited to: a communications manager 223, an API abstraction application 217, a management and arbitration application 219, and an adaptation application 221 (these applications can also be layers of a single or plurality of applications, such as a service provider application 215).

The communication manager 223 may handle all transports, forwarding incoming messages to the abstraction application (or layer) 217, and ensuring that outgoing messages are sent via the proper transport channel.

The abstraction application 217 may transform incoming messages into action to be performed by a service and create outgoing messages out of information and events from local modules.

The management and arbitration application 219 may virtualize the local vehicle based computing system for each application by managing use of HMI elements and governing resource consumption.

The adaptation application 221 may encapsulate the local API and coexist with core local applications. This application may be modified or replaced to allow a communication connection to be compatible with different versions of the vehicle based computing system software.

In at least one exemplary implementation, a message protocol may be used to encode messages exchanged between a mobile client and the vehicle based computing system to command and control a Human Machine Interface (HMI) for purposes such as displaying and speaking text, listening, propagating button-pushes, etc. These messages may contain small amounts of data (e.g. text phrases, button identifiers, status, thumb-drive file data, configuration data, etc.). This protocol, using complementary support provided by the message specification, will permit multiple client application sessions to concurrently use a single transport channel.

Other open standard protocols may be used where appropriate and available, such as the A2DP BLUETOOTH profile for streaming audio from the mobile device to the vehicle audio system (not all mobile devices support A2DP). However, some open standard protocols are not always available on every mobile device, or are not always implemented uniformly. In addition, API support for use of these protocols may not be uniformly implemented on all mobile platforms. Therefore, the function of some open standard protocols (e.g. OBEX) may be provided as part of the message protocol, when it is technically simple enough to do and a significant increase in uniformity can be achieved across platforms.

Transports may be configured to support full-duplex communication in order to provide prompt event propagation between client applications and the vehicle based computing system. A transport may also support multiple concurrent channels in order to permit concurrent connections from one or more devices.

One or more exemplary transports are Serial (RS232) and TCP/IP. Serial transport communication with mobile devices may be provided, for example, through a BLUETOOTH Serial Profile. Most mobile devices support this profile, and most provide a common programming model for its use. The serial programming model is widely used and highly uniform. If the vehicle based computing system provides Serial-over-USB support, then the Serial transport could be used with any mobile device that is USB-connected to the vehicle based computing system (if that mobile device provides support for Serial over its USB connection).

In addition, a TCP/IP transport provides the ability for applications running on the vehicle based computing system to use the local HMI. If the module provides external TCP/IP connectivity in the future, this transport will allow external clients to connect over that TCP/IP connectivity. The socket programming model (including the API) for TCP/IP is typically highly portable. Such an example would be a locally loaded application 229, using a client-side API 227 to communicate through a local socket 225.

In at least one exemplary embodiment, the decoupled nature of the system, where the vehicle based computing system is unaware of client applications until they connect, demands a discovery mechanism whereby system and the mobile device client can discover each other's existence and capabilities.

Dual discovery is possible, whereby the mobile device client will be able to discover the environment, locale and HMI capabilities of the local platform and the system will be able to discover the applications available on a remote device and have the ability to launch those applications.

In this illustrative embodiment, the native API 231 has various services associated therewith, that can be accessed by remote devices through function calls. For example, a display function 233 may be provided.

The system may provide an API allowing client applications to write to vehicle displays and query their characteristics. The characteristics of each display may be described generically such that client applications will not require hard coding for individual display types (Type 1 FDM, Type 3 GAP, Type 6 Navigation, etc). Specifically, the system may enumerate each display and indicate each display's intended usage (primary or secondary display). Furthermore, the system may enumerate the writable text fields of each display, provide each writable text field's dimensions, and indicate each field's intended general usage. To promote consistency with the current user interface, support for the scrolling of long text may also be included, where permitted by driver distraction rules.

The system may also include text to speech capability 241. The system may provide an API allowing client applications to leverage the vehicle based computing system's text-to-speech functionality. Client applications may also be able to interleave the play of audio icons with spoken text. They may be able to utilize preexisting audio icons or provide short audio files of their own. The format of application provided audio files will be limited to those natively supported.

Further functionality of the illustrative embodiments may include one or more button inputs 243. One example of this would be controlling an application on a remote device through use of buttons installed in a vehicle (such as steering wheel buttons).

Another exemplary function could be a speech recognition function 245. The system may provide an API allowing client applications to leverage the vehicle based computing system's speech recognition capabilities. The system may also simplify the vehicle based computing systems' native speech recognition APIs to provide a simpler development model for client application developers. The speech grammar APIs will also be simplified while retaining most of the native API's flexibility. For example, the system (on behalf of client applications) will recognize global voice commands such as "BLUETOOTH Audio" or "USB" and pass control to the appropriate application.

Audio I/O 237 may also be provided in an exemplary implementation. The system may provide regulated access to the HMI while enforcing the interface conventions that are coded into core applications. A single "in focus" client application may be allowed primary access to the display, buttons, audio capture or speech engine. Client applications without focus (e.g. Text Messaging, Turn By Turn Navigation, etc.) will be allowed to make short announcements (e.g. "New Message Arrived" or "Turn Left"). Stereo audio may continue to play after a mobile device audio application.

The system may provide an API allowing client applications to capture audio recorded using a microphone. The client application may specify duration of the capture, though capture can be interrupted at any time. Captured audio may be returned to the client application or stored on a local or portable drive.

Additionally, file I/O 235 may also be provided with the system. For example, the system may provide an API allowing client applications to read from, write to, create and/or delete files on a remote drive. Access to the remote drive file system may be restricted in that a client application may only read/edit data in a directory specific to that client application.

While the best mode for carrying out the invention has been described in detail, those familiar with the art to which this invention relates will recognize various alternative designs and embodiments for practicing the invention as defined by the following claims.

What is claimed:

1. A vehicle computing system comprising:
a processor;
a plurality of outputs, controllable by the processor; and
a transceiver capable of communication with a wireless device, and controllable by the processor for at least passing data to and from the processor;
wherein the processor is configured to instruct launching of an internet radio application on the wireless device, receive a list of internet radio stations from the wireless device, present the list of internet radio stations over at least one output, receive and relay an internet radio station selection to the wireless device, receive streamed song data, from the Internet, passing through the wireless device, corresponding to a song provided by the selected internet radio station, and playback received song data over at least one output.

2. The system of claim 1, wherein the processor is further configured to receive and present a playlist of upcoming songs to be provided by the internet radio station.

3. The system of claim 2, wherein the processor is configured to receive a request to move to another song on the playlist, and to relay this request to the wireless device for relay to a server associated with the internet radio station.

4. The system of claim 1, wherein the processor is further configured to receive feedback on a song and relay the feedback to the wireless device for relay to a server associated with the internet radio station.

5. The system of claim 4, wherein the feedback relates to a currently playing song.

6. The system of claim 4, wherein the feedback relates to a previously completed song.

7. The system of claim 4, wherein the feedback includes a rating.

8. A computer-implemented method comprising:
receiving a list of internet radio stations from a wireless device application;

presenting the list of internet radio stations over at least one output controllable by a vehicle computing system (VCS);

relaying an internet radio station selection to the application;

receiving streamed song data provided by the selected internet radio station, from the Internet, passing through the wireless device to a VCS; and playing back received song data as output music.

9. The method of claim 8, further comprising:

receiving a playlist of upcoming songs on the internet radio station; and presenting the playlist to a vehicle occupant.

10. The method of claim 9, further comprising:

receiving a request to move to a different song on the playlist; and sending the request to the application for relay to a server associated with the internet radio station.

11. The method of claim 8, comprising receiving feedback on a song; and sending the feedback to the application for relay to a server associated with the internet radio station.

12. The method of claim 11, wherein the song is a currently playing song.

13. The method of claim 11, wherein the song is a song that previously completed playing.

14. The method of claim 11, wherein the feedback includes a rating.

15. A computer implemented method comprising:

receiving a first instruction from a wireless device executing an Internet radio application, the application configured to stream music from the Internet, the instruction instructing a prompt of a user to control the Internet radio application;

prompting the user to control the Internet radio application in accordance with the first instruction;

receiving control input from the user;

sending a response to the wireless device, in response to the received control input, the response including at least a request to stream a song from the Internet;

receiving a second instruction, responsive to the sent response, instructing playback of the song;

receiving streaming song data;

playing back the received streaming song data in accordance with the second instruction; and sending feedback about a song to the wireless device, including a song rating.

* * * * *